United States Patent
Cheng et al.

(10) Patent No.: US 7,564,867 B2
(45) Date of Patent: Jul. 21, 2009

(54) ENHANCED UPLINK DATA TRANSMISSION

(75) Inventors: Fang-Chen Cheng, Randolph, NJ (US);
Teck Hu, Budd Lake, NJ (US);
Jung-Tao Liu, Madison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 915 days.

(21) Appl. No.: 10/642,581

(22) Filed: Aug. 19, 2003

(65) Prior Publication Data
US 2005/0053088 A1    Mar. 10, 2005

(51) Int. Cl.
*H04J 3/00* (2006.01)
*H04J 3/02* (2006.01)
*H04B 7/216* (2006.01)

(52) U.S. Cl. .................... 370/464; 370/537
(58) Field of Classification Search .......... 370/462, 370/464, 469, 537, 538, 342
See application file for complete search history.

(56) References Cited

U.S. PATENT DOCUMENTS

| | | | |
|---|---|---|---|
| 2002/0122400 A1 | 9/2002 | Vayanos et al. | 370/338 |
| 2003/0076799 A1* | 4/2003 | Kwak et al. | 370/335 |
| 2003/0086381 A1* | 5/2003 | Terry et al. | 370/280 |
| 2004/0229624 A1* | 11/2004 | Cai et al. | 455/449 |
| 2005/0259582 A1* | 11/2005 | Belaiche | 370/232 |
| 2006/0098655 A1* | 5/2006 | Zeira et al. | 370/389 |

OTHER PUBLICATIONS

3GPP Organizational Partners, "3rd Generation Partnership Project: Technical Specification Group Radio Access Network; Multiplexing and Channel Coding (FDD)", Jun. 2000, pp. 1-62 (whole document), XP002202956.
3GPP TSG-SA2 Meeting, "On the Use of a Short TTI for Enhanced Uplink DCH", vol. 31, Feb. 18, 2003, whole document, XP002288648.
European Search Report dated Nov. 4, 2004.

* cited by examiner

*Primary Examiner*—Wing F Chan
*Assistant Examiner*—Saba Tsegaye

(57) ABSTRACT

In the method for enhanced uplink data transmission, a transport channel for each transmission mode is independently generated. Each transport channel has an associated transmission time interval (TTI), and the generated transport channels are multiplexed on a selected TTI basis to form a composite transport channel. The selected TTI is selected from one of the TTIs associated with the independently generated transport channels. The composite transport channel is then mapped onto a physical channel.

12 Claims, 1 Drawing Sheet

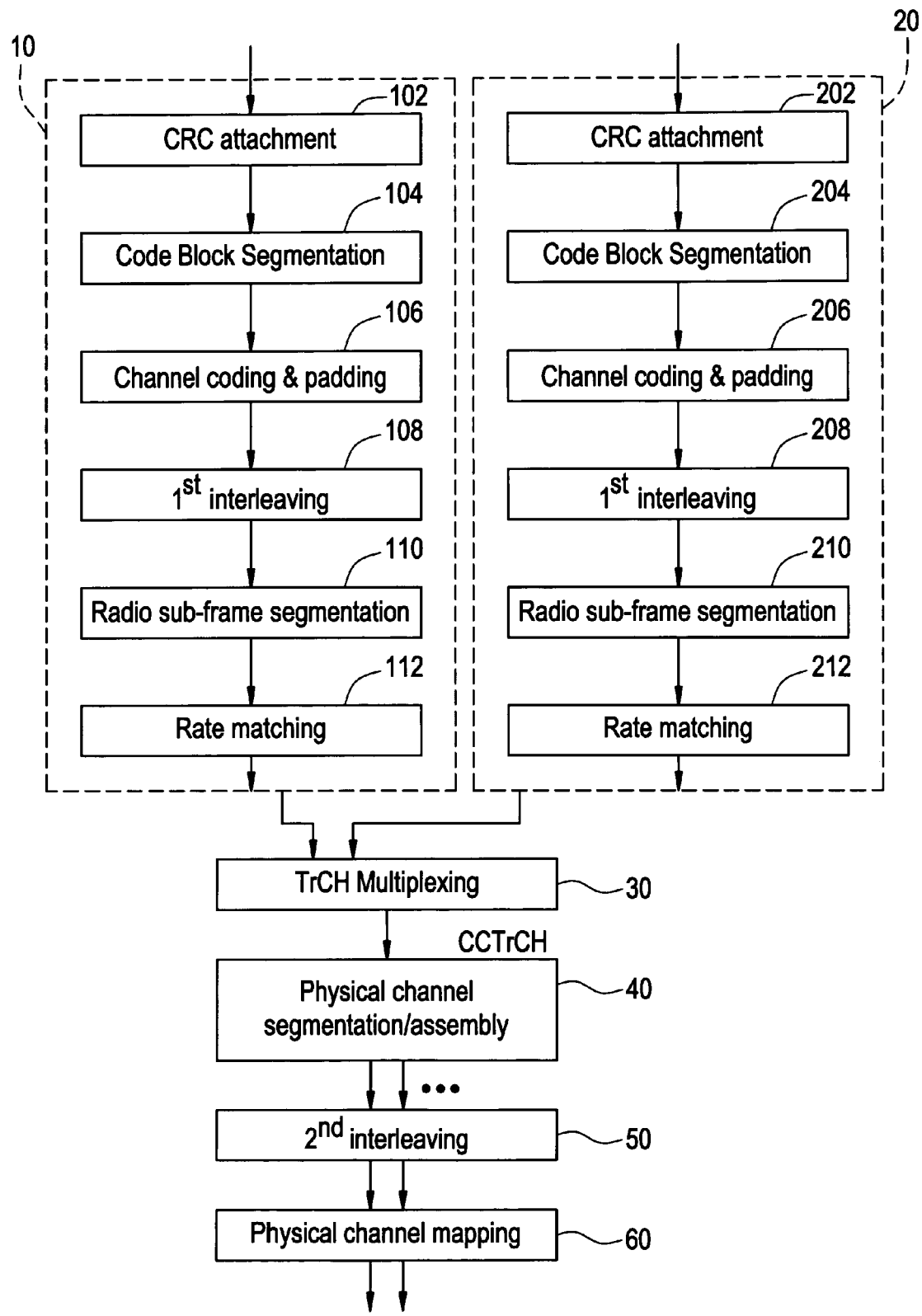

ENHANCED UPLINK DATA TRANSMISSION

BACKGROUND OF THE INVENTION

A UMTS typically includes a radio access network, referred to as a UMTS terrestrial radio access network (UTRAN). The UTRAN may interface with a variety of separate core networks (CN). The core networks in turn may communicate with other external networks (ISDN/PSDN, etc.) to pass information to and from a plurality of wireless users, or user equipments (UEs), that are served by radio network controllers (RNCs) and base transceiver stations (BTSs, also referred to as Node Bs), within the UTRAN, for example.

Development of UMTS as well as the releases of the CDMA2000 family of standards, and other $3^{rd}$ generation wireless standards, has focused in part on enhancing the reverse or up link (UE to Node B) operation to support high-speed packet data applications. Currently, two types of modes or methods for scheduling UE transmissions are envisioned by these standards: a time and rate scheduled mode (also called a scheduled transmission mode) and an autonomous mode (also called a rate control scheduling mode).

The time and rate scheduled method schedules transmissions by having the Node B send a schedule grant message with an explicit instruction for the user equipment (UE) to transmit. A grant for a scheduled transmission designates the UE that is to transmit as well as the transmission format (data rate, frame/packet duration, and transmission power) the UE is to employ. The rate of a transmission is the number of information bits that constitute the transmission divided by the time interval over which the bits are sent.

The autonomous method on the other hand provides a looser form of control on UE transmissions. Here, the RNC via the Node B or the NodeB acting without the RNC sends a rate control directive or instruction, which is typically a one bit transmission, that can be either broadcast to all UEs in the cell/sector (common rate control) or transmitted individually to UEs (dedicated rate control). The rate control bit has a predefined meaning. For example, according to one proposal the rate control bit indicates whether the UE is to transmit at a predetermined rate limit or not transmit at all. The non-zero rate limit is signaled via an actual transmission to the UE while the zero rate limit is signaled by the Node B transmitter's silence. According to another proposal, the rate control bit indicates whether the UE is to transmit at an increased or decreased rate limit. As a further example, such as when the rate control method is being used to affect multiple UEs, the rate control bit(s) probabilistically influences the rate limit.

SUMMARY OF THE INVENTION

In the method of the present invention, a transport channel for each transmission mode is independently generated. Each transport channel has an associated transmission time interval (TTI), and the generated transport channels are multiplexed on a selected TTI basis to form a composite transport channel. The selected TTI is selected from one of the TTIs associated with the independently generated transport channels. The composite transport channel is then mapped onto a physical channel.

In one exemplary embodiment, a UE includes a MAC (multiple access controller) entity or unit for each possible transmission scheduling method or mode employed by the network (RNC and/or Node B). Each MAC entity in the UE independently generates a transport channel having a transmission time interval (TTI) suited to the transmission scheduling method employed by the network. A transport channel multiplexing unit in the UE multiplexes the independently generated transport channels to form a composite transport channel, which is then mapped onto a physical channel for transmission to the Node B. The composite transport channel has a TTI, which is selected from one of the TTIs for the independently generated transport channels.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 1 illustrates an exemplary embodiment of a portion of a UE according to the present invention.

DETAILED DESCRIPTION OF EMBODIMENTS

Although the following description of the present invention is based on the Universal Mobile Telecommunications System (UMTS) network, it should be noted that the exemplary embodiments shown and described herein are meant to be illustrative only and not limiting in any way. For example, the present invention is equally applicable to CDMA2001x EV-DV. As such, various modifications will be apparent to those skilled in the art.

Where used below, base transceiver station (BTS) and Node-B are synonymous and may describe equipment that provides data connectivity between a packet switched data network (PSDN) such as the Internet, and one or more mobile stations. Additionally where used below, the terms user, user equipment (UE), subscriber, mobile, mobile station and remote station are synonymous and describe a remote user of wireless resources in a wireless communication network. For example, a UE may be connected to a computing device such as a laptop, personal computer (PC), or it may be a self-contained data device such as a personal digital assistant (PDA) or cellular phone. Further, a UE may be functionally divided into a computing device such as a PC, which is responsible for point-to-point protocol (PPP) and higher later protocol functionality (IP, TCP, RTP, HTTP, etc.) and an access terminal (AT). The AT is responsible for the airlink and radio link protocol (RLP) layers.

In the present invention, a UE includes a MAC (multiple access controller) unit or entity for each possible transmission scheduling method employed by the network (RNC and/or Node B). While conventionally, the RNC includes an associated MAC entity, it is contemplated that the present invention may used even if the associated MAC entity (or entities) were moved to the Node B. Each MAC entity (hereinafter simply "MAC") in the UE generates a transport channel having a transmission time interval (TTI) suited to the transmission scheduling method employed by the network. The UE multiplexes the independently generated transport channels to form a composite transport channel, which is then mapped onto a physical channel for transmission to the Node B.

FIG. 1 illustrates an exemplary embodiment of a portion of a UE according to the present invention. In this embodiment, it is assumed that a Node B with which the UE communicates supports two transmission scheduling modes: the time scheduled mode and the autonomous mode. Accordingly, as shown in FIG. 1, the UE includes a first MAC 10 for the time scheduled mode and a second MAC 20 for the autonomous mode. It will be understood that the UE may support different and/or additional transmission scheduling modes, and that for additional transmission scheduling modes, the UE would include additional associated MACs.

Each of the first and second MACs 10 and 20 receive packet data units (PDUs) from the UE data buffer (not shown) in the well-known manner (e.g., first and second MACs 10 and 20 receive PDUs containing logical DCH data after HARQ processing from different transmission modes with each transmission mode having its own HARQ entity). Each of the first and second MACs 10 and 20 processes the received PDUs to independently generate first and second transport channels.

Specifically, the first and second MACs 10 and 20 respectively include first and second CRC attachment units 102 and 202 that error correction encode the respectively received PDUs. The first and second CRC attachment units 102 and 202 attach CRC bits to the respectively received PDUs forming a transport block. The size of the transport block depends on the transmission mode, and is flexibly set to match the controlled data rate of the scheduled transmission; the controlled data rate being dependent on the mode of scheduling transmissions. Next, first and second code block segmentation units 104 and 204 divide the respective encoded transport blocks into smaller code block segments. First and second channel coding and padding units 106 and 206 channel encode the respective code block segments and attach padding bits. First and second interleavers 108 and 208 interleave the respective channel encoded code block segments at an interval of the transport channel transmission time interval (TTI).

First and second radio sub-frame segmentation units 10 and 210 segment the respective interleaved channel encoded data into radio sub-frames of the transport channel TTI. The second radio sub-frame segmentation unit 210 segments the interleaved channel encoded data into, for example, 10 ms TTIs. The first radio sub-frame segmentation unit 10 segments the interleaved channel encoded data into, for example, 2 ms TTIs. This shorter TTI reduces the round trip time (RTT) in communication between the network (RNC or Node B) and the UE. This improves the responsiveness of the network to channel conditions of an individual UE, and allows the network to better schedule transmissions during favorable channel conditions.

First and second rate matching units 112 and 212 rate match the respective segmented data to produce the respective transport channels. A transport channel (TrCH) multiplexer 30 receives the independently generated first and second transport channels from the first and second MACs 10 and 20, and multiplexes the first and second transport channels into a composite transport channel (CCTrCH). In creating the CCTrCH, the transport channel multiplexer 30 creates the CCTrCH having a TTI that equals the minimum TTI of the TTIs for the received transport channels. For example, if both the first and second transport channels have TTIs of 2 ms and 10 ms, and the transport channel multiplexer 30 receives both transport channels, then the transport channel multiplexer 30 generates the CCTrCH having a TTI of 2 ms. However, if only the second transport channel were received, then the transport channel multiplexer generates the CCTrCH having a TTI of 10 ms.

In this exemplary embodiment, the TTI of the second transport channel is a multiple of the smaller TTI of the first transport channel. This makes creating the CCTrCH easier. Namely, regardless of the number of transport channels being multiplexed, in an exemplary embodiment, the transport channels have TTIs that are equal to or are multiples of the shortest TTI. In another exemplary embodiment, the TTI of each transmission mode is one of a sub-multiple and multiple of one of the TTIs, for example the 10 ms TTI.

Subsequent to forming the CCTrCH, the CCTrCH undergoes segmentation and assembly for the physical channel at a physical channel segmentation/assembly unit 40. As will be appreciated, to promote flexibility, the physical channel segmentation/assembly unit 40 allows both the segmentation and concatenation of CCTrCH with different TTI lengths. This also allows the mapping unit 60 described below to map the CCTrCH to, for example, either a 10 ms radio frame or a 2 ms radio frame.

A second interleaver 50 interleaves the output from the physical channel segmentation/assembly unit 40. The second interleaver 50 interleaves the data at an interval corresponding to the TTI of the received data. Then, a mapping unit 60 maps the interleaved data into the physical channel for transmission.

The 2 ms TTI of the time scheduled mode and associated sub-frame structure in the above-described exemplary embodiment is shorter than the length of current uplink radio frames. However, no change of the uplink short scrambling code is necessary and only minor changes may be made to the uplink long scrambling code. For example, the long scrambling sequences may be constructed from position wise modulo 2 sum of 7680 chip segments of two binary m-sequences generated by means of two generator polynomials of degree 25 instead of the 38400 chip segments in current 10 ms radio frame structures.

The invention being thus described, it will be obvious that the same may be varied in many ways. Such variations are not to be regarded as a departure from the spirit and scope of the invention, and all such modifications are intended to be included within the scope of the following claims.

We claim:

1. A method for enhanced uplink data transmission, comprising:

independently generating, at a user equipment, a transport channel for each of a plurality of transmission modes, each transport channel having an associated transmission time interval (TTI) that is at least one of a sub-multiple and a multiple of 10 ms, the plurality of transmission modes including, a scheduled transmission mode in which both a time and rate of transmission for transmission by the user equipment is determined based on a received instruction from a base station, and an autonomous transmission mode in which only the rate of transmission for transmission by the user equipment is limited by the received instruction from the base station;

multiplexing, by the user equipment, the generated transport channels to form a composite transport channel, the formed composite channel having one TTI, the TTI of the formed composite transport channel being equal to the minimum TTI of the TTIs associated with the independently generated transport channels; and mapping, by the user equipment, the composite transport channel onto a physical channel at a radio frame corresponding to the TTI of the composite transport channel.

2. The method of claim 1, wherein the independently generating step generates first and second transport channels having first and second TTIs, respectively, and the second TTI is a multiple of the first TTI.

3. The method of claim 2, wherein the first TTI is 2 ms and the second TTI is 10 ms.

4. The method of claim 1, wherein the generating step independently generates transport channels for more than one transmission mode.

5. The method of claim 4, wherein the first TTI is 2 ms and the second TTI is 10 ms.

6. The method of claim 1, wherein the mapping step maps the composite transport channel onto the physical channel based on the TTI of the formed composite channel.

7. An apparatus for enhanced uplink data transmission, comprising:

at least two control units each independently generating, at a user equipment a transport channel for a different transmission mode, the at least two control units including at least a first control unit generating a first transport channel for a scheduled transmission mode in which both a time and rate of transmission for transmission by the apparatus is determined based on a received instruction from a base station, and a second control unit generating a second transport channel for an autonomous transmission mode in which only the rate of transmission for transmission by the apparatus is limited by the received instruction from the base station, each transport channel having an associated transmission time interval (TTI) that is at least one of a sub-multiple and a multiple of 10 ms;

a transport channel multiplexer at the user equipment multiplexing the generated transport channels to form a composite transport channel, the formed composite channel having one TTI, the TTI of the formed composite transport channel being equal to the minimum TTI of the TTIs associated with the independently generated transport channels; and a mapping unit, at the user equipment, mapping the composite transport channel onto a physical channel, at a radio frame corresponding to the TTI of the composite transport channel.

8. A method of wireless uplink communication comprising:

mapping, at a user equipment, at least two transport channels within a physical channel, at a radio frame corresponding to a transmission time interval (TTI) of the composite transport channel, the at least two transport channels including, a first transport channel for a scheduled transmission mode in which both a time and rate of transmission for transmission by the user equipment is determined based on a received instruction from a base station, and a second transport channel for an autonomous transmission mode in which only the rate of transmission for transmission by the user equipment is limited by the received instruction from the base station, each transport channel having an associated TTI that is at least one of a sub-multiple and a multiple of 10 ms;

multiplexing, at the user equipment, the at least two transport channels to form a composite transport channel, the formed composite channel having one TTI, the TTI of the formed composite transport channel being equal to the minimum TTI of the TTIs associated with the at least two transport channels.

9. The method of claim 8, wherein each of the transport channels has a distinct TTI associated thereto.

10. The method of claim 8, wherein the at least two transport channels are generated for each transmission mode.

11. The method of claim 10, wherein the first and second transport channels are generated having first and second TTIs, respectively, and the second TTI is a multiple of the first TTI.

12. The method of claim 8, wherein the step of mapping maps the composite transport channel onto the physical channel based on the TTI of the formed composite channel.

* * * * *